(12) United States Patent
Duong

(10) Patent No.: US 11,225,870 B2
(45) Date of Patent: Jan. 18, 2022

(54) IMPELLER SPLITTER OPTIMIZATION

(71) Applicant: PRATT & WHITNEY CANADA CORP., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/858,067

(22) Filed: Apr. 24, 2020

(65) Prior Publication Data

US 2020/0248561 A1 Aug. 6, 2020

Related U.S. Application Data

(63) Continuation of application No. 15/681,003, filed on Aug. 18, 2017, now Pat. No. 10,669,854.

(51) Int. Cl.
*F01D 5/14* (2006.01)
*F04D 29/28* (2006.01)
*F01D 5/04* (2006.01)
*F02C 3/04* (2006.01)

(52) U.S. Cl.
CPC .............. *F01D 5/146* (2013.01); *F01D 5/04* (2013.01); *F01D 5/145* (2013.01); *F04D 29/284* (2013.01); *F02C 3/04* (2013.01); *F05D 2220/32* (2013.01); *F05D 2240/305* (2013.01); *F05D 2240/306* (2013.01)

(58) Field of Classification Search
CPC ........... F01D 5/146; F01D 5/145; F01D 5/04; F01D 5/048; F04D 29/284; F02C 3/04; F05D 2220/32; F05D 2240/306; F05D 2240/305; Y02T 50/60
See application file for complete search history.

(56) References Cited

U.S. PATENT DOCUMENTS

| | | | | |
|---|---|---|---|---|
| 3,069,072 A | * | 12/1962 | Birmann | F04D 29/284 415/163 |
| 6,508,626 B1 | * | 1/2003 | Sakurai | F04D 29/284 416/180 |
| 8,512,000 B2 | | 8/2013 | Dettmann et al. | |
| 9,140,271 B2 | | 9/2015 | Sugimoto et al. | |
| 2004/0005220 A1 | * | 1/2004 | Kawamoto | F04D 29/284 416/223 R |

(Continued)

*Primary Examiner* — Joseph J Dallo
*Assistant Examiner* — Scott A Reinbold
(74) *Attorney, Agent, or Firm* — Norton Rose Fulbright Canada LLP

(57) ABSTRACT

An impeller rotatable about a rotation axis, has a hub, blades extending from the hub to tips circumferentially distributed around the rotation axis, the blades having pressure sides and suction sides, the blades including splitter blades interspersed between full blades, a chord length of the splitter blades less than a chord length of the full blades, first flow channels defined between pressure sides of the splitter blades and suction sides of the full blades, second flow channels defined between suction sides of the splitter blades and pressure sides of the full blades, respective widths of the first and second flow channels at a given rotor location defined between adjacent splitter and full blades at the given rotor location, a width of the first flow channels increasing from the hub to the tips of the splitter blades along at least a portion of the chord length of the splitter blades.

20 Claims, 5 Drawing Sheets

(56) References Cited

U.S. PATENT DOCUMENTS

2010/0254816 A1* 10/2010 Dettmann ............. F04D 29/284
                                                    416/223 A
2012/0328444 A1* 12/2012 Sugimoto ............ F04D 29/681
                                                    416/223 B
2013/0195667 A1*  8/2013 Hoshi .................... F04D 29/30
                                                    416/212 R
2017/0298951 A1* 10/2017 Itoh ...................... F04D 29/284

* cited by examiner

IMPELLER SPLITTER OPTIMIZATION

CROSS-REFERENCE TO RELATED APPLICATIONS

This application is a continuation of U.S. patent application Ser. No. 15/681,003 filed on Aug. 18, 2017, the entire contents of which are incorporated by reference herein.

TECHNICAL FIELD

The application relates generally to gas turbine engines and, more particularly, to impellers used in such engines.

BACKGROUND OF THE ART

Impellers may be used as radial compressors in gas turbine engines. An impeller has a hub and blades disposed therearound. When the impeller rotates about its rotational axis, a secondary flow that includes three-dimensional vortical flow structures develops in blade passages due to the rotation of the flow and to the non-uniform inlet pressure profiles. While main flow is responsible for extracting or providing energy to the working fluid, the secondary flow, which is transverse to the main flow, acts to reduce energy available for transfer to the working fluid. The secondary flow creates flows that go from pressure sides to suction sides of the blades. The secondary flow then contributes to tip leakage flow and to pre-mature flow blockage in the impeller.

SUMMARY

In one aspect, there is provided an impeller rotatable about a rotation axis, comprising a hub, blades extending from the hub to tips circumferentially distributed around the rotation axis, the blades having pressure sides and suction sides, the blades including splitter blades interspersed between full blades, a chord length of the splitter blades less than a chord length of the full blades, first flow channels defined between pressure sides of the splitter blades and suction sides of the full blades, second flow channels defined between suction sides of the splitter blades and pressure sides of the full blades, respective widths of the first and second flow channels at a given rotor location defined between adjacent splitter and full blades at the given rotor location, a width of the first flow channels increasing from the hub to the tips of the splitter blades along at least a portion of the chord length of the splitter blades.

In another aspect, there is provided an impeller rotatable about a rotation axis, comprising a hub, blades extending from the hub to tips circumferentially distributed around the rotation axis, the blades having pressure sides and suction sides, the blades including splitter blades interspersed between full blades, a chord length of the splitter blades less than a chord length of the full blades, first flow channels defined between pressure sides of the splitter blades and suction sides of the full blades, second flow channels defined between suction sides of the splitter blades and pressure sides of the full blades, the splitter blades and the full blades extending away from one another form the hub to tips of the splitter blades within the first flow channels and along at least a portion of the chord length of the splitter blades.

In yet another aspect, there is provided a compressor including an impeller as defined above.

DESCRIPTION OF THE DRAWINGS

Reference is now made to the accompanying figures in which.

DETAILED DESCRIPTION

Figure 1:
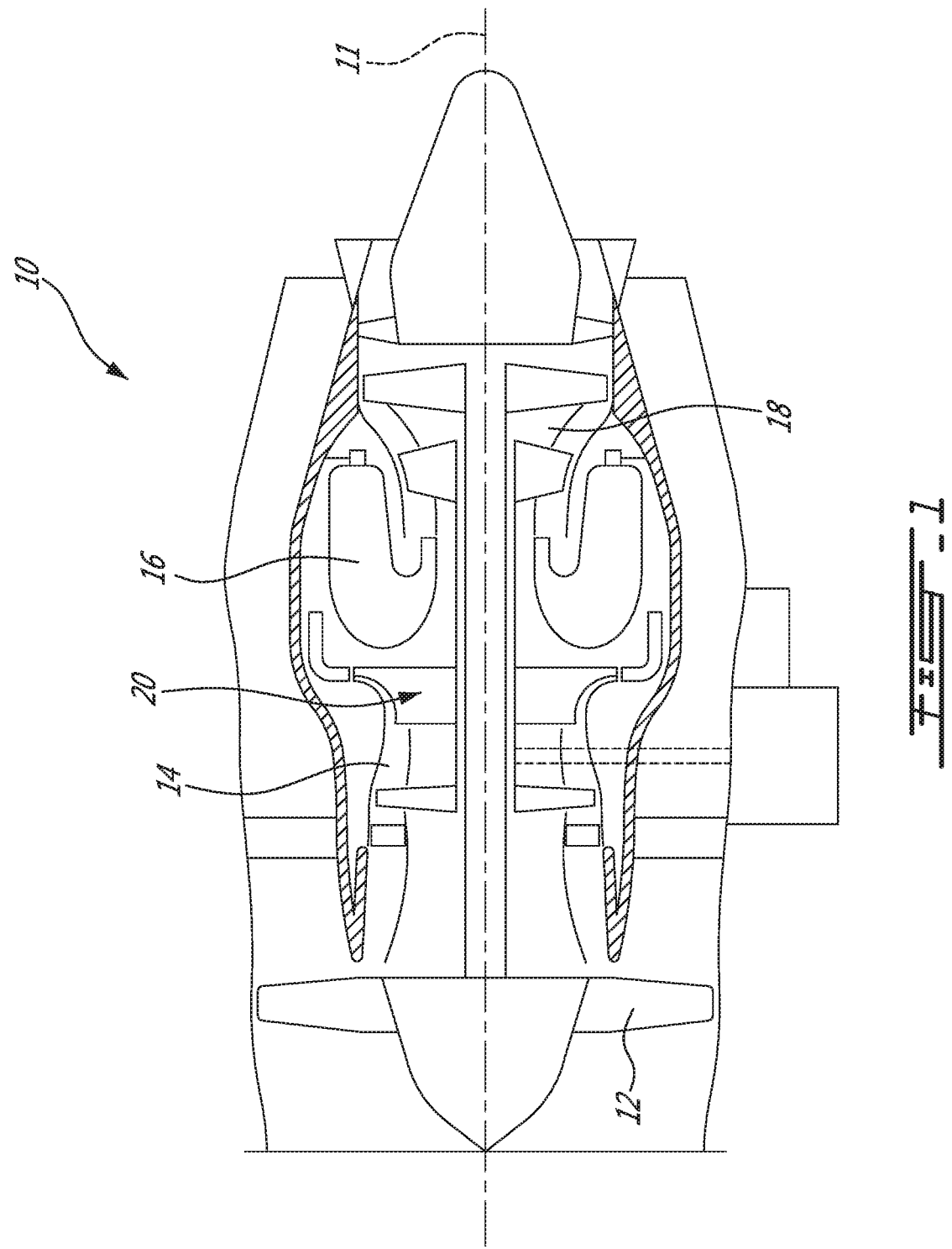
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. In the embodiment shown, the compressor section 14 includes an impeller 20 also referred to as a radial compressor. The fan 12, the compressor section 14, and the turbine section 18 are configured for rotation about a longitudinal axis 11 of the gas turbine engine 10.

Figure 2:
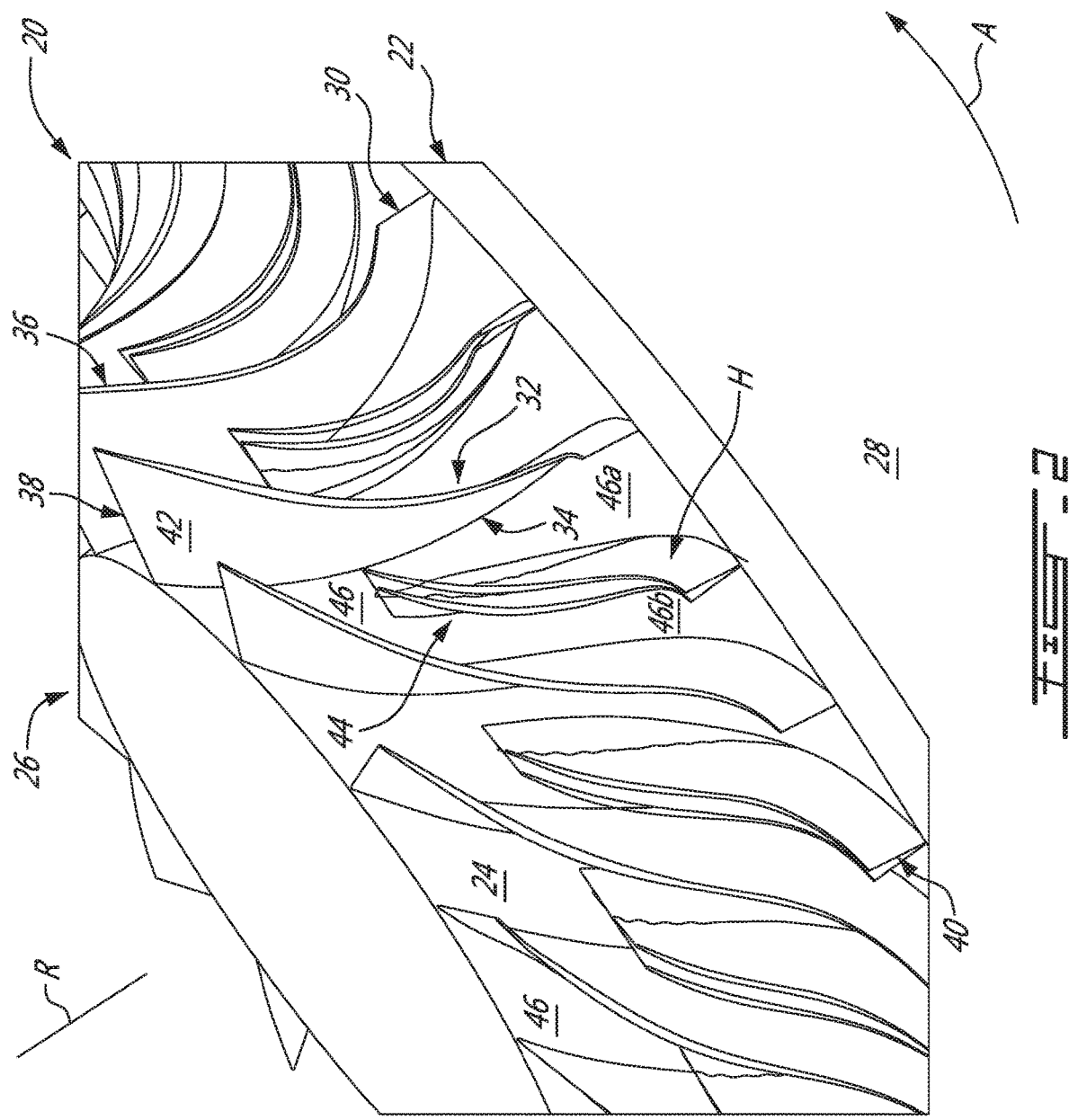
FIG. 2 is a schematic tridimensional view of an impeller of the engine of FIG. 1.
Figure 3:
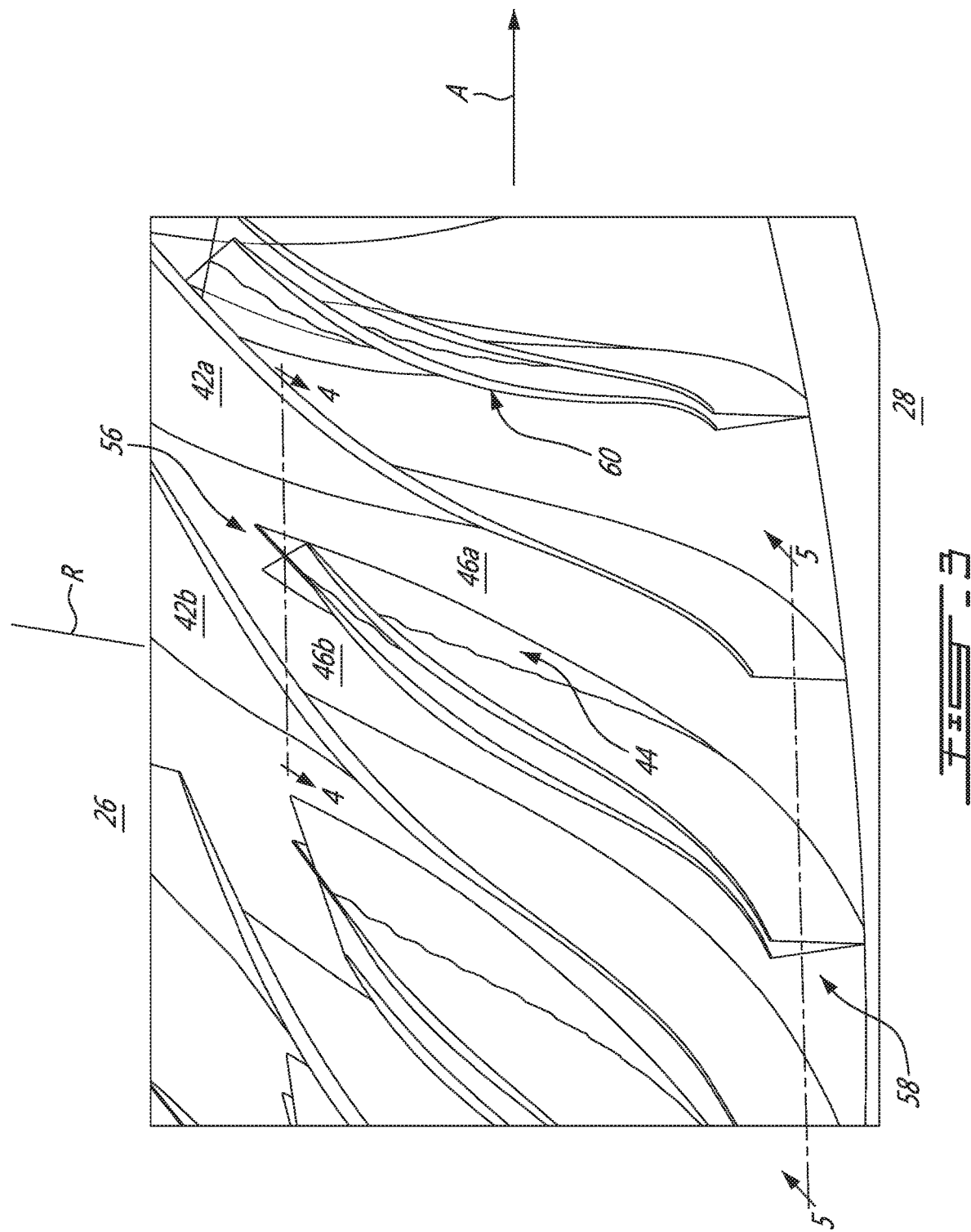
FIG. 3 is a schematic enlarged view of the impeller of FIG. 2.

Referring now to FIGS. 2-3, the impeller 20 is configured for rotation about a rotational axis R, which, in the embodiment shown, is coincident with the engine longitudinal axis 11. The impeller 20 has a hub 22 having an axial-to-radial shape. Stated otherwise, in use, a flow of working fluid circulates substantially tangentially to a surface 24 of the hub 22. The flow, in an upstream location 26 of the impeller 20, is aligned substantially axially relative to the axis R and, in a downstream location 28, is aligned substantially radially relative to the axis R. In other words, the flow circulates generally parallel to the axis R when entering the impeller 20 and generally perpendicularly to the axis R, and away therefrom, when exiting the impeller 20. If the impeller 20 is used as a turbine impeller instead of a compressor impeller, this arrangement is opposite.

The impeller 20 further includes blades 30 disposed on the hub 22. The blades 30 have pressure sides 32 and suction sides 34. The pressure and suction sides 32 and 34 extend on opposite sides of the blades from the hub 22 toward tips 36 of the blades 30 and from leading edges 38 toward trailing edges 40 of the blades 30. The blade leading and trailing edges 38 and 40 are spaced apart from one another by chord lengths. The hub 22 and the tips of the blades 36 are spaced apart from one another by spans.

In the embodiment shown, the blades 30 include full blades 42 and splitter blades 44 circumferentially disposed in alternation around the rotational axis R. Stated otherwise, in an embodiment, one of the splitter blades 44 may be disposed between each set of adjacent two of the full blades 42. Chord lengths of the splitter blades 44 are less than chord lengths of the full blades 42. In the illustrated embodiment, the splitter blades chord lengths range between 50% to 80% of the full blades chord lengths. An adjacent pair of the full blades 42 is illustrated and referred to as blades 42a and 42b herein, to facilitate the understanding of the subsequent paragraphs. However, the concepts described for blades 42a and 42b may apply to the other pairs of the adjacent blades 42.

The impeller 20 has a flow channel 46 between each adjacent two of the full blades 42, which include the first full blade 42a and the second full blade 42b. The first full blade 42a is disposed before the second full blade 42b relative to a direction of rotation of the impeller 20 around the axis R. The direction of rotation is illustrated by arrow A. The flow channels 46 are configured for receiving an incoming flow at the upstream location 26 and for outletting the flow at the downstream location 28. Along the flow channels 46, the flow changes direction from generally axially, and parallel to the rotational axis R, to generally radially, and perpendicular to the rotational axis R. A width of each of the flow channels 46 varies from the upstream 26 to the downstream 28 locations. For any given position along the rotational axis R between the upstream 26 and downstream 28 locations, the height of each of the flow channels 46 may be constant in a radial direction from the hub 22 toward the blade tips 36. The width varies along the axis R. The width of each of the flow channels 46 may increase from the upstream 26 to the downstream 28 locations.

The blade leading edges 38 are circumferentially offset from the blade trailing edges 40. Consequently, the flow circulating within the flow channels 46 moves around the rotational axis R from the upstream location 26 to the downstream location 28. In the case of a compressor impeller, this rotation allows the impeller to transfer energy to the working fluid. Alternatively, in the case of a turbine impeller, this rotation allows the impeller to extract energy from the working fluid.

In the embodiment shown, each of the flow channels 46 is divided in two downstream of the upstream location 26 by the splitter blades 44. Hence, the flow channels 46 each diverge into a first flow channel 46a and a second flow channel 46b. The first flow channel 46a is bounded by a suction side 34 of the first full blade 42a, a pressure side 32 of one of the splitter blades 44 adjacent the first full blade 42a and by the hub 22. The second flow channel 46b is bounded by a suction side 34 of the one of the splitter blades 44, by a pressure side 32 of the second full blade 42b adjacent to the one of the splitter blades 44, and by the hub 22.

In some circumstances, secondary flow, generally referred to as three-dimensional vortical flow structures, develops in the first and second flow channels 46a and 46b due to flow turning and non-uniform inlet pressure profiles. While main flow is responsible for energy extraction/transfer, the secondary flow is transverse to the main flow and acts to reduce energy available for energy extraction/transfer. The secondary flow originates in a boundary layer that flows along the blades 30 and contains span-wise velocity gradient. When boundary flow is turned, traverse velocity components are introduced.

In some cases, the secondary flow creates cross flows that go from the blade pressure sides 32 to the blade suction sides 34. These flows are carried off the adjacent suction side 34 from the hub 22 to the tips 36 due to pressure difference and centrifugal force. The secondary flow interacts with main blade tip clearance flow. This interaction may result in mixing loss and flow blockage. The combination of leakage and secondary flow is observed to reach the entire passage and may create large flow blockage. Large flow blockage may lead to premature impeller inducer stalling, or affect performance of downstream components.

In the illustrated embodiment, the splitter blades 44 are rotated such that portions adjacent to the hub 22 are moved toward the suction sides 34 of the adjacent full blades 42. At the hub 22, these offsets create larger pitches between pressure sides 32 of the full blades 42 and the adjacent splitter blades 44 and smaller pitches between the adjacent splitter blades 44 and the suction sides 34 of the full blades 42. The increase in pitch may tend to drive more of the secondary flow toward the splitter suction sides while reducing flow toward the adjacent full blade suction sides. With less flow toward the adjacent full blade suction sides 34 there may be less flow centrifuged along the suction sides, and hence there may be less flow to interact with tip leakage flow, and thus, there may be less mixing loss. At the splitter blade tips 36, the splitter blades 44 are rotated in the opposite direction compared to their rotation at the hub 22. This increases the pitches between the splitter blades 44 and the adjacent full blade suction sides 34.

Referring now to FIGS. 2-5, standard splitter blades H are not part of the impeller 20 and are shown for illustration purposes only. An impeller having the standard splitter blades H constitutes a baseline configuration against which performances of the disclosed impeller 20 are compared. Each of the original splitter blades H is centered between two adjacent ones of the full blades 42. In other words, a circumferential distance between one of the original splitter blades H and the first full blade 42a corresponds to a circumferential distance between the one of the original splitter blades H and the second full blade 42b at any axial location along the rotational axis R. It is understood that a circumferential distance between two blades is defined as a circumferential distance between a first location on one of the two blades and a second location on the other one of the two blades, the second location circumferentially corresponding to the first location.

Figure 4:
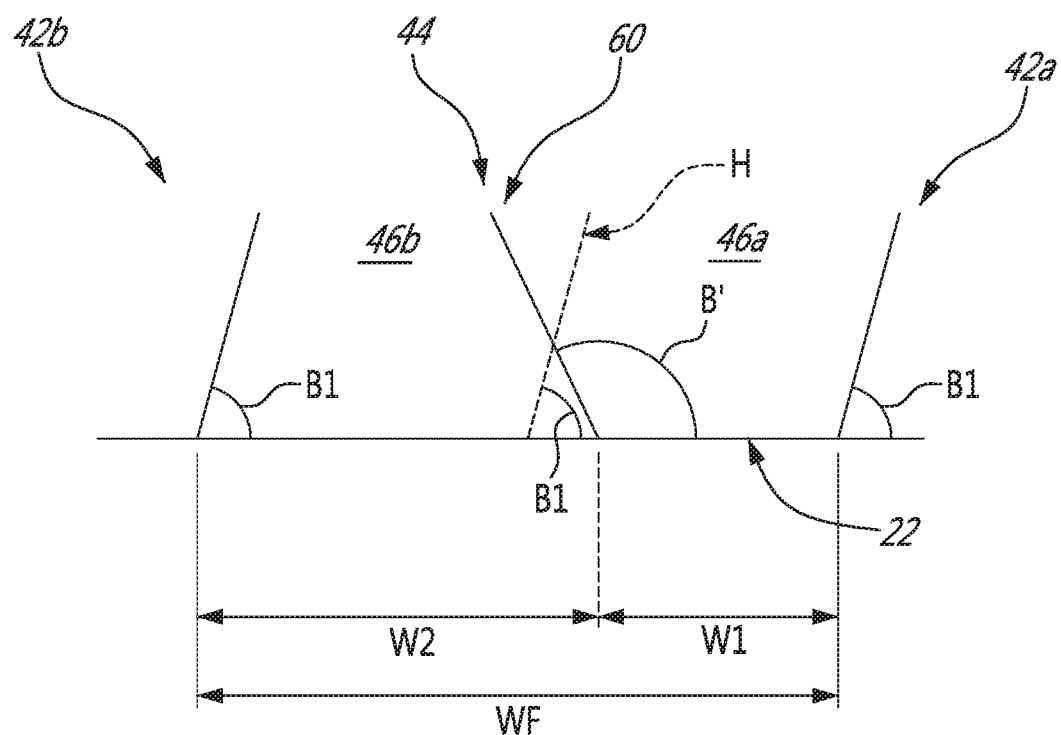
FIG. 4 is a schematic cross-sectional view following line 4-4 of FIG. 3 illustrating leading edges of blades of the impeller of FIG. 2.
Figure 5:
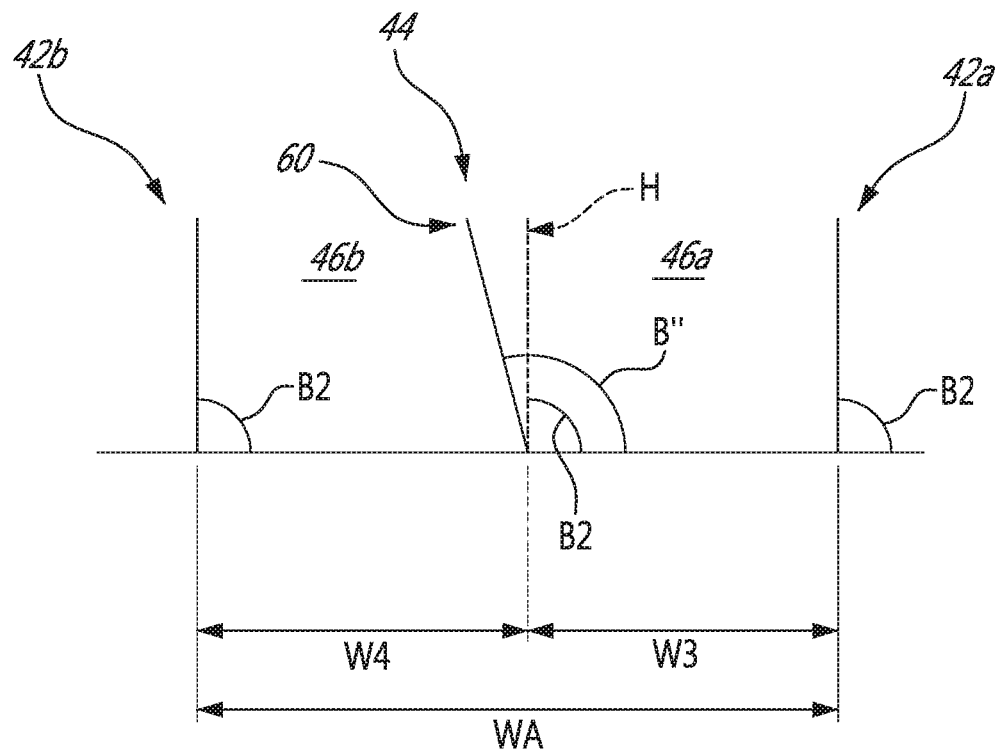
FIG. 5 is a schematic cross-sectional view following line 5-5 of FIG. 3 illustrating trailing edges of the blades of the impeller of FIG. 2.

Referring more particularly to FIGS. 4-5, the standard splitter blades H are shown in dashed lines whereas the splitter blades 44 are shown in full lines. At leading edges 56 of the splitter blades 44 (FIG. 4) a width W1 of the first channels 46a increases from the hub 22 toward tips 60 of the splitter blades 44. Consequently, still at the leading edges 56, a width W2 of the second channels 46b decreases from the hub 22 toward the tips 60. An angle B' between the splitter blades 44 and the hub 22, at the splitter blade leading edges 56, is obtuse whereas an angle B1 between the original splitter blades H and the hub 22 is acute at the splitter blade leading edges 56. An angle B" between the splitter blades 44 and the hub 22, at the splitter blade trailing edges 58, is obtuse and has a value more than a value of an angle B2 between the original splitter blades H and the hub 22 at the splitter blade trailing edges 58. In the illustrated embodiment, a difference between the angles B' and B1 ranges from 15 to 25 degrees and a difference between the angles B" and B2 ranges from 5 to 15 degrees. In the embodiment shown, at the trailing edges 58 (FIG. 5), a width W3 of the first channels 46a increases from the hub 22 toward the splitter blade tips 60. A width W4 of the second channels 46b decreases from the hub 22 toward the tips 60. Stated otherwise, a circumferential distance between the splitter blade leading edges 56 and the adjacent second full blades 42b decreases from the hub 22 toward the splitter blade tips 60. A circumferential distance between the splitter blade trailing edges 58 and the adjacent second full blade 42b decreases from the hub 22 toward the splitter blade tips 60.

Referring more particularly to FIG. 4, at the splitter blade leading edges 56, the width W1 of the first flow channels 46a increases from the hub 22 to the splitter blade tips 60 from less than half a foremost combined width WF of two adjacent ones of the first and second flow channels 46a and 46b to more than half of the foremost combined width WF. Consequently, the width W2 of the second flow channels 46b decreases from the hub 22 to the splitter blade tips 60 from more than half the foremost combined width WF to less than half of the foremost combined width WF. In other words, a foremost ratio of the circumferential distance between the leading edge 56 of one of the splitter blades 44 and the second blade 42b over a circumferential distance between the first and second full blades 42a and 42b at the splitter blade leading edges 56 decreases from a value more than 0.5 at the hub 22 to a value less than 0.5 at the tips 60. In a particular embodiment, the foremost ratio varies from 0.7 at the hub 22 to 0.3 at the tips 60. In a particular embodiment, the foremost ratio varies at a constant rate from the hub 22 to the tips 60.

Still referring to FIG. 4, in other words, at the hub 22, the width W1 of the first flow channels 46a at leading edges 56 of the splitter blades 44 is less than the width W2 of the second flow channels 46b at the leading edges 56 of the splitter blades 44. At the tips 60, the width W1 of the first flow channels 46a at the splitter leading edges 56 is more than the width W2 of the second flow channels 46b at the splitter leading edges 56.

Referring more particularly to FIG. 5, at the splitter blade trailing edges 58, the width W3 of the first flow channels 46a increases from the hub 22 to the splitter blade tips 60 from half an aft most combined width WA of the two adjacent ones of the first and second flow channels 46a and 46b to more than half of the aft most combined width WA. The width W4 of the second flow channels 46b decreases from the hub 22 to the tips 60 from half the aft most combined width WA to less than half of the aft most combined width WA. In other words, an aft most ratio of the circumferential distance between the trailing edge 58 of the one of the splitter blades 44 and the adjacent one of the second full blades 42b over a circumferential distance between the first and second full blades 42a and 42b at the trailing edges 58 of the splitter blades 44 decreases from a value of 0.5 at the hub 22 to a value less than 0.5 at the tips 60. In the embodiment shown, at the splitter blade tips 60, the foremost ratio is less than the aft most ratio and the angle B' is more than the angle B".

Still referring to FIG. 5, in other words, at the hub 22, the width W3 of the first flow channels 46a at trailing edges 58 of the splitter blades 44 corresponds to the width W4 of the second flow channels 46b at the trailing edges 58 of the splitter blades 44. At the tips 60, the width W3 of the first flow channels 46a at the splitter trailing edges 58 is more than the width W4 of the second flow channels 46b at the splitter trailing edges 58.

Figure 6:
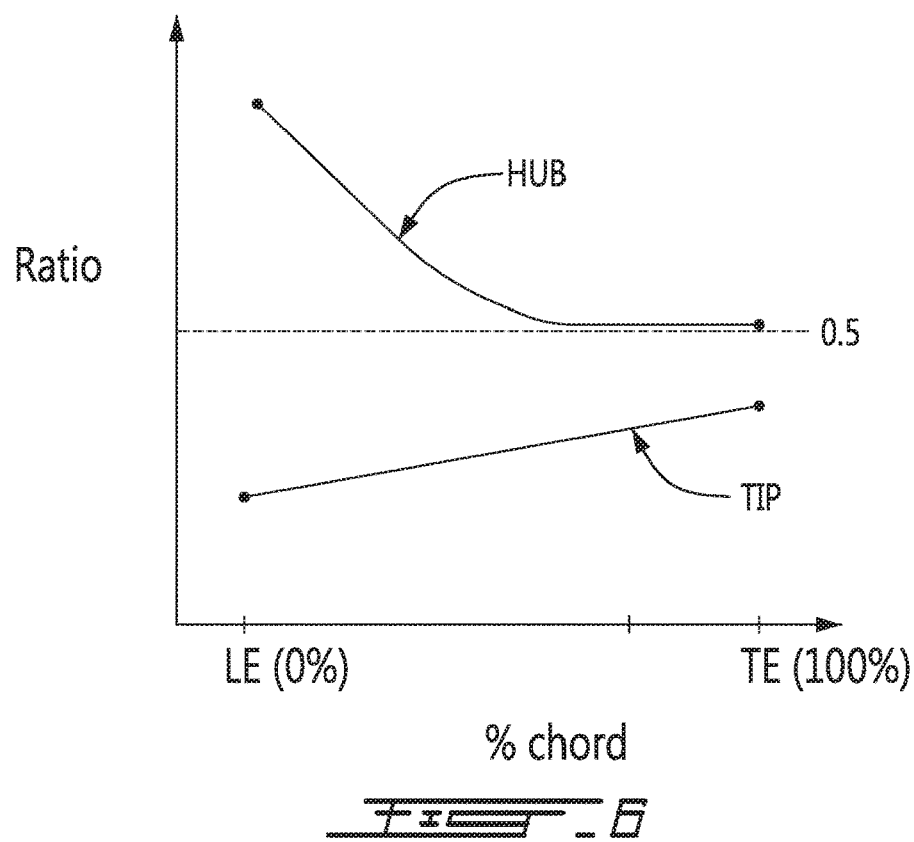
FIG. 6 is graph illustrating a variation of a circumferential distance between a full blade and an adjacent splitter blade of the impeller of FIG. 2 along a hub of the impeller and along a tip of the splitter blade in function of a chord-wise position between a leading edge and a trailing edge of the splitter blade.
Figure 7:
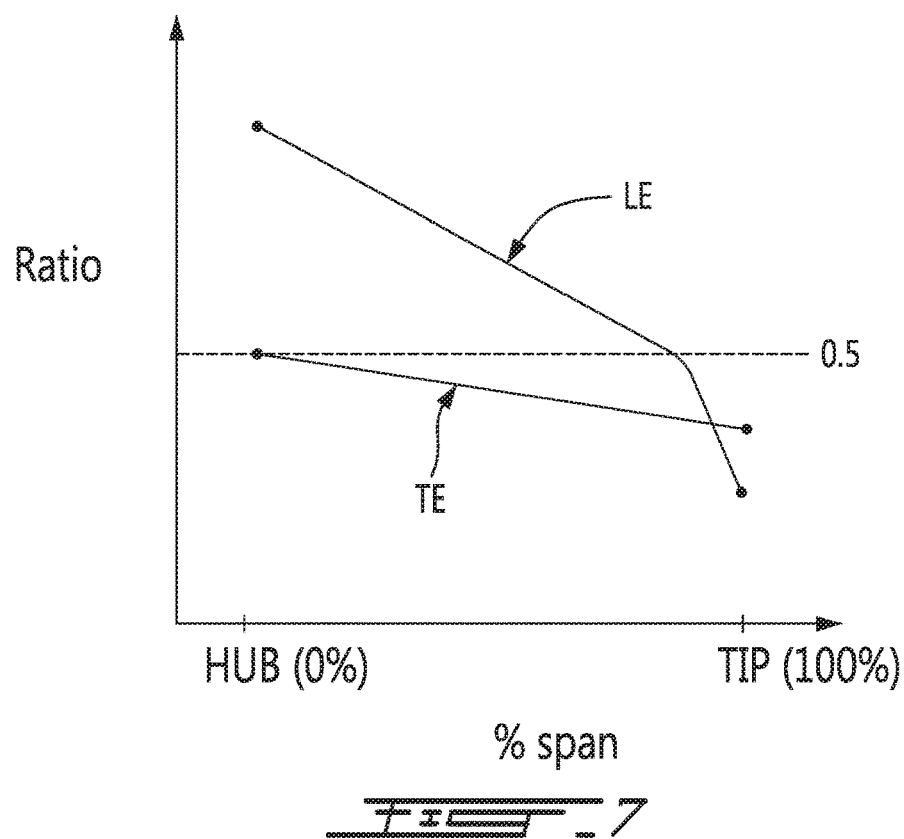
FIG. 7 is a graph illustrating a variation of a circumferential distance between a full blade and an adjacent splitter blade of the impeller of FIG. 2 along the leading and trailing edges of the splitter blade in function of a span-wise position between the hub and the tip of the splitter blade.

Referring now also to FIGS. 6 and 7, graphs illustrate a possible variation of a relative position of the splitter blades 44 relative to the first and second full blades 42a and 42b. A relative position corresponds to a ratio of a circumferential distance between a given location on one of the second blades 42b and a circumferentially corresponding location on an adjacent one of the splitter blades 44 over a circumferential distance between the given location and a circumferentially corresponding location on an adjacent one of the first blades 42a. FIG. 6 illustrates a variation of the ratio between the splitter blade leading and trailing edges 56 and 58 on the hub 22 and on the splitter blade tips 60. FIG. 7 illustrates a variation of the ratio between the hub 22 and the splitter blade tips 60 on the splitter blade leading and trailing edges 56 and 58.

As illustrated in FIG. 6, at the hub 22, the ratio decreases from a value more than 0.5 at the splitter blade leading edges 56 to a value of 0.5 between the leading and trailing edges 56 and 58. In the illustrated embodiment, the ratio reaches a value of 0.5 at about 60% of the splitter blade chord lengths from the splitter blade leading edges 56. In the embodiment shown, at the hub 22, the ratio follows a monolithic distribution. In the illustrated embodiment, at the splitter blade tips 60, the ratio increases from about 0.7 at the leading edges 56 to about 0.35 at the trailing edges 58. In the illustrated embodiment, the ratio mostly following a linear relationship at the tips 60.

Referring to FIGS. 3 and 6, at the hub, the width of the first flow channels 46a downstream of the splitter leading edges 56 is less than the width of the second flow channels 46b along at least a portion of the chord length of the splitter blades 44. In the embodiment shown, this portion corresponds to about 60% of the splitter blade chord lengths from the splitter blade leading edges 56. At the splitter tips 60, the width of the first flow channels 46a downstream of the splitter leading edges 56 is more than the width of the second flow channels 46b along at least a portion of the splitter blade chord lengths. In the embodiment shown, the portion corresponds to the entire length of the splitter blades 44.

As illustrated in FIG. 7, the ratio for both the splitter blade leading and trailing edges 56 and 58 decreases from 0.7 and 0.5 to 0.3 and 0.35, respectively, from the hub 22 toward the splitter blade tips 60. In the embodiment shown, the variation of the ratio is linear at the trailing edges 58. For the leading edges 56, the ratio decreases at a constant rate until it reaches 0.5 and increases thereafter such that the ratio change more rapidly near the blade tips 60. Other configurations are contemplated.

Referring to all figures, to operate the impeller 20 a flow entering the impeller 20 is first received within flow channels 46 circumferentially distributed around the impeller 20. Then, for each of the flow channels 46 the flow of working fluid is divided in a first flow channel portion 46a and in a second flow channel portion 46b. And, at the upstream location 26, a greater portion of the flow is diverged in the second flow channel portion 46b relative to the first flow channel portion 46a by exposing the flow to a greater flowing area in a radially-inward region of the second flow channel portion than in a radially-inward region of the first flow channel portion. The flowing area of a given region of a flow channel corresponds to an area of a cross-section of the given region of the flow channel. The cross-section is taken along a plane that is perpendicular to the hub 22.

In the embodiment shown, at the upstream location 26, the flow is exposed to a greater flowing area in a radially-outward region of the first flow channel portion 46a than in a radially-outward region of the second flow channel portion 46b. At the downstream location 28, the flow is exposed to a greater flowing area in the radially-outward region of the first flow channel portion 46a than in the radially-outward region of the second flow channel portion 46b. At the downstream location 28, the flow is exposed to a flowing area that is greater in the first flow channel portion 46a than in the second flow channel portion 46b.

Embodiments disclosed herein includes:

A. An impeller rotatable about a rotation axis, comprising a hub, blades extending from the hub to tips circumferentially distributed around the rotation axis, the blades having pressure sides and suction sides, the blades including splitter blades interspersed between full blades, a chord length of the splitter blades less than a chord length of the full blades, first flow channels defined between pressure sides of the splitter blades and suction sides of the full blades, second flow channels defined between suction sides of the splitter blades and pressure sides of the full blades, respective widths of the first and second flow channels at a given rotor location defined between adjacent splitter and full blades at the given rotor location, a width of the first flow channels increasing from the hub to the tips of the splitter blades along at least a portion of the chord length of the splitter blades.

B. An impeller rotatable about a rotation axis, comprising a hub, blades extending from the hub to tips circumferentially distributed around the rotation axis, the blades having pressure sides and suction sides, the blades including splitter blades interspersed between full blades, a chord length of the splitter blades less than a chord length of the full blades, first flow channels defined between pressure sides of the splitter blades and suction sides of the full blades, second flow channels defined between suction sides of the splitter blades and pressure sides of the full blades, the splitter blades and the full blades extending away from one another form the hub to tips of the splitter blades within the first flow channels and along at least a portion of the chord length of the splitter blades.

C. A compressor having the impeller as defined in embodiment A or B.

Embodiments A, B, and C may include any of the following elements, in any combinations:

Element 1: the at least the portion of the chord length of the splitter blades includes leading edges of the splitter blades. Element 2: the at least the portion of the chord length of the splitter blades extends from leading edges of the splitter blades to trailing edges of the splitter blades. Element 3: a rate of increase of the width of the first flow channels from the hub to the tips along the at least the portion of the chord length of the splitter blades decreases toward trailing edges of the splitter blades. Element 4: the width of the first flow channels at the hub corresponds to width of the second flow channel at the hub at about 60% from leading edge of the splitter blades. Element 5: the width of the first flow channels at the tips is greater than the width of the second flow channels at the tips along an entirety of the chord length of the splitter blades. Element 6: a radial distance relative to the rotation axis from the hub to the rotation axis increases from leading edges to the trailing edges of the splitter blades. Element 7: an angle between the splitter blades and the hub is greater than an angle between the full blades and the hub along an entirety of the chord length of the splitter blades. Element 8: the angle between the full blades and the hub increases from leading edges of the splitter blades toward trailing edges thereof. Element 9: a radial distance relative to the rotation axis from the hub to the rotation axis increases from leading edges to the trailing edges of the splitter blades. Element 10: the at least the portion of the chord length of the splitter blades includes the leading edges of the splitter blades. Element 11: the at least the portion of the chord length of the splitter blades extends from the leading edges of the splitter blades to trailing edges of the splitter blades. Element 12: a rate of increase of a width of the first flow channels from the hub to the tips along the at least the portion of the chord length of the splitter blades decreases toward the trailing edges of the splitter blades. Element 13: the width of the first flow channels at the hub corresponds to a width of the second flow channels at the hub at about 60% from the leading edge of the splitter blades. Element 14: the width of the first flow channels at the tips is greater than the width of the second flow channels at the tips along an entirety of the chord length of the splitter blades. Element 15: an angle between the splitter blades and the hub is greater than an angle between the full blades and the hub along an entirety of the chord length of the splitter blades. Element 16: the angle between the full blades and the hub increases from the leading edges of the splitter blades toward trailing edges thereof. Element 17: the blades extend in a circumferential direction relative to the rotation axis from leading edges to trailing edges thereof, the circumferential direction in an opposite direction than a direction of rotation of the impeller.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An impeller rotatable about a rotation axis, comprising:
a hub,
blades extending from the hub to tips circumferentially distributed around the rotation axis, the blades having pressure sides and suction sides, the blades including splitter blades interspersed between full blades, a chord length of the splitter blades less than a chord length of the full blades,
first flow channels defined between pressure sides of the splitter blades and suction sides of the full blades, and
second flow channels defined between suction sides of the splitter blades and pressure sides of the full blades, respective widths of the first and second flow channels at a given rotor location defined between adjacent splitter and full blades at the given rotor location, a width of the first flow channels increasing from the hub to the tips of the splitter blades along a portion of the chord length of the splitter blades.

2. The impeller of claim 1, wherein the portion of the chord length of the splitter blades includes leading edges of the splitter blades.

3. The impeller of claim 1, wherein the portion of the chord length of the splitter blades extends from leading edges of the splitter blades to trailing edges of the splitter blades.

4. The impeller of claim 1, wherein a rate of increase of the width of the first flow channels from the hub to the tips along the portion of the chord length of the splitter blades decreases toward trailing edges of the splitter blades.

5. The impeller of claim 1, wherein the width of the first flow channels at the hub is equal to a width of the second flow channel at the hub at 60% chord length from a leading edge of the splitter blades.

6. The impeller of claim 1, wherein the width of the first flow channels at the tips is greater than the width of the second flow channels at the tips along an entirety of the chord length of the splitter blades.

7. The impeller of claim 1, wherein a radial distance relative to the rotation axis from the hub to the rotation axis increases from leading edges to the trailing edges of the splitter blades.

8. The impeller of claim 1, wherein an angle between the splitter blades and the hub is greater than an angle between the full blades and the hub along an entirety of the chord length of the splitter blades.

9. The impeller of claim 8, wherein the angle between the full blades and the hub increases from leading edges of the splitter blades toward trailing edges thereof.

10. A compressor comprising the impeller as defined in claim 1.

11. An impeller rotatable about a rotation axis, comprising:
a hub,
blades extending from the hub to tips circumferentially distributed around the rotation axis, the blades having pressure sides and suction sides, the blades including splitter blades interspersed between full blades, a chord length of the splitter blades less than a chord length of the full blades,
first flow channels defined between pressure sides of the splitter blades and suction sides of the full blades, and
second flow channels defined between suction sides of the splitter blades and pressure sides of the full blades, the pressure sides of the splitter blades and the suction sides of the full blades extending away from one another from the hub to the tips and along a portion of the chord length of the splitter blades.

12. The impeller of claim 11, wherein a radial distance relative to the rotation axis from the hub to the rotation axis increases from leading edges to the trailing edges of the splitter blades.

13. The impeller of claim 12, wherein the portion of the chord length of the splitter blades includes the leading edges of the splitter blades.

14. The impeller of claim 13, wherein the portion of the chord length of the splitter blades extends from the leading edges of the splitter blades to trailing edges of the splitter blades.

15. The impeller of claim 14, wherein a rate of increase of a width of the first flow channels from the hub to the tips along the portion of the chord length of the splitter blades decreases toward the trailing edges of the splitter blades.

16. The impeller of claim 15, wherein the width of the first flow channels at the hub is equal to a width of the second flow channels at the hub at 60% chord length from the leading edge of the splitter blades.

17. The impeller of claim 16, wherein the width of the first flow channels at the tips is greater than the width of the second flow channels at the tips along an entirety of the chord length of the splitter blades.

18. The impeller of claim 17, wherein an angle between the splitter blades and the hub is greater than an angle between the full blades and the hub along an entirety of the chord length of the splitter blades.

19. The impeller of claim 18, wherein the angle between the full blades and the hub increases from the leading edges of the splitter blades toward trailing edges thereof.

20. The impeller of claim 11, wherein the blades extend in a circumferential direction relative to the rotation axis from leading edges to trailing edges thereof, the circumferential direction in an opposite direction than a direction of rotation of the impeller.

* * * * *